US009384731B2

(12) United States Patent
Tjalve et al.

(10) Patent No.: US 9,384,731 B2
(45) Date of Patent: Jul. 5, 2016

(54) DETECTING SPEECH INPUT PHRASE CONFUSION RISK

(71) Applicant: MICROSOFT TECHNOLOGY LICENSING, LLC, Redmond, WA (US)

(72) Inventors: Michael Tjalve, Bellevue, WA (US); Pavan Karnam, Seattle, WA (US); Dennis Mooney, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 181 days.

(21) Appl. No.: 14/073,631

(22) Filed: Nov. 6, 2013

(65) Prior Publication Data

US 2015/0127347 A1    May 7, 2015

(51) Int. Cl.
*G10L 15/05*    (2013.01)
*G10L 15/00*    (2013.01)
(Continued)

(52) U.S. Cl.
CPC .................. *G10L 15/19* (2013.01); *G10L 15/01* (2013.01); *G10L 15/187* (2013.01); *G10L 25/78* (2013.01); *G10L 25/48* (2013.01); *G10L 2015/0635* (2013.01); *G10L 2025/786* (2013.01)

(58) Field of Classification Search
USPC ............ 704/1–10, 200.1, 231–232, 236–240, 704/246–255, 257, 270, E15.001–E15.05, 704/E11.001–E11.007
See application file for complete search history.

(56) References Cited

U.S. PATENT DOCUMENTS 5,689,616 A * 11/1997 Li ........................ G10L 15/005
                                                   704/232
5,940,793 A *  8/1999 Attwater ................. G10L 15/18
                                                   704/231

(Continued)

FOREIGN PATENT DOCUMENTS

EP         2387031 A1    11/2011

OTHER PUBLICATIONS

ISA European Patent Office, International Search Report and Written Opinion Issued in PCT/US2014/064031, Feb. 12, 2015, Netherlands, 10 Pages.

(Continued)

*Primary Examiner* — Pierre-Louis Desir
*Assistant Examiner* — David Kovacek
(74) *Attorney, Agent, or Firm* — Gregg Wisdom; Judy Yee; Micky Minhas (57) ABSTRACT

Embodiments are disclosed that relate to identifying phonetically similar speech grammar terms during computer program development. For example, one disclosed embodiment provides a method including providing a speech grammar development tool configured to receive input of a text representation of each of a plurality of proposed speech grammar terms, convert each text representation to a phonetic representation of the speech grammar term, compare the phonetic representation of the speech grammar term to the phonetic representations of other speech grammar terms using a weighted similarity matrix, and provide an output regarding risk of confusion between two proposed speech grammar terms based upon a comparison of the phonetic representations of the two proposed speech grammar terms. The method further includes receiving data regarding incorrect speech grammar term identification, and modifying one or more weights in the weighted similarity matrix based upon the data.

18 Claims, 5 Drawing Sheets

(51) Int. Cl.
*G10L 15/28* (2013.01)
*G10L 25/78* (2013.01)
*G10L 15/19* (2013.01)
*G10L 15/187* (2013.01)
*G10L 15/01* (2013.01)
*G10L 25/48* (2013.01)
*G10L 15/06* (2013.01)

(56) References Cited

U.S. PATENT DOCUMENTS

| | | | |
|---|---|---|---|
| 6,073,099 | A | 6/2000 | Sabourin et al. |
| 6,134,528 | A * | 10/2000 | Miller ............... G06F 17/277 704/258 |
| 6,185,533 | B1 * | 2/2001 | Holm ................. G10L 13/10 704/211 |
| 6,990,448 | B2 * | 1/2006 | Charlesworth ... G06F 17/30038 704/243 |
| 7,013,276 | B2 | 3/2006 | Bickley et al. |
| 7,310,600 | B1 * | 12/2007 | Garner ............... G10L 15/12 704/234 |
| 7,917,363 | B2 | 3/2011 | Starkie |
| RE43,082 | E * | 1/2012 | Gutowitz ........... G06F 3/0237 341/20 |
| 8,930,192 | B1 * | 1/2015 | Meisel ............... G10L 13/08 704/260 |
| 2002/0069058 | A1 * | 6/2002 | Jin ..................... G06F 3/018 704/249 |
| 2002/0107688 | A1 * | 8/2002 | Otsuka .............. G10L 13/10 704/231 |
| 2003/0004722 | A1 * | 1/2003 | Butzberger ........ G10L 15/285 704/257 |
| 2003/0069729 | A1 | 4/2003 | Bickley et al. |
| 2004/0215449 | A1 * | 10/2004 | Roy .................. G10L 15/1822 704/211 |
| 2005/0105712 | A1 * | 5/2005 | Williams .......... G10L 13/027 379/265.02 |
| 2006/0200351 | A1 * | 9/2006 | Acero ............... G10L 15/02 704/254 |
| 2007/0038450 | A1 * | 2/2007 | Josifovski ......... G06F 17/30265 704/255 |
| 2007/0055525 | A1 * | 3/2007 | Kennewick ....... G10L 15/08 704/257 |
| 2008/0065381 | A1 * | 3/2008 | Matsumoto ....... G10L 21/0364 704/254 |
| 2008/0077387 | A1 * | 3/2008 | Ariu ................. G06F 17/289 704/3 |
| 2008/0167872 | A1 * | 7/2008 | Okimoto ........... G10L 15/22 704/251 |
| 2008/0228485 | A1 * | 9/2008 | Owen ............... G06F 17/30681 704/254 |
| 2009/0112586 | A1 * | 4/2009 | Williams .......... G10L 15/01 704/239 |
| 2009/0125308 | A1 * | 5/2009 | Ambler ............. G10L 15/26 704/254 |
| 2011/0000360 | A1 * | 1/2011 | Saino ............... G10H 1/0008 84/622 |
| 2011/0035219 | A1 * | 2/2011 | Kadirkamanathan . G10L 15/005 704/239 |
| 2011/0282667 | A1 | 11/2011 | Hernandez-Abrego |
| 2012/0078630 | A1 * | 3/2012 | Hagen .............. G09B 19/06 704/254 |
| 2012/0303371 | A1 * | 11/2012 | Labsky ............. G10L 13/08 704/260 |
| 2015/0127347 | A1 * | 5/2015 | Tjalve ............... G10L 15/19 704/257 |

OTHER PUBLICATIONS

Anguita, Jan et al., "Detection of confusable Words in Automatic Speech Recognition," IEEE Signal Processing Letters, vol. 12, No. 8, Aug. 2005, pp. 585-588.

IPEA European Patent Office, Second Written Opinion Issued in PCT Application No. PCT/US2014/064031, Sep. 30, 2015, WIPO, 5 Pages.

IPEA European Patent Office, International Preliminary Report on Patentability Issued in Application No. PCT/US2014/064031, Feb. 10, 2016, WIPO, 7 pages.

* cited by examiner

| | CNS | CNT | VOI | ANT | |
|---|---|---|---|---|---|
| p | 100 | 0 | 0 | 100 | ... |
| b | 100 | 0 | 80 | 100 | ... |
| t | 100 | 0 | 0 | 80 | ... |
| d | 100 | 0 | 80 | 80 | ... |
| k | 100 | 0 | 0 | 0 | ... |
| g | 100 | 0 | 80 | 0 | ... |
| f | 100 | 100 | 0 | 100 | ... |
| v | 100 | 100 | 80 | 100 | ... |
| th | 100 | 100 | 0 | 90 | ... |
| dh | 100 | 100 | 80 | 90 | ... |

Fig. 4

COMPUTING DEVICE
- LOGIC SUBSYSTEM — 402
- STORAGE SUBSYSTEM — 404
- DISPLAY SUBSYSTEM — 406
- INPUT SUBSYSTEM — 408
- COMMUNICATION SUBSYSTEM — 410

DETECTING SPEECH INPUT PHRASE CONFUSION RISK

BACKGROUND

Computer speech recognition may be used to receive computing device inputs in the form of human speech detected via audio transducers such as microphones. Many different types of computing devices may utilize speech inputs, including but not limited to mobile devices, laptop computers, desktop computers, gaming devices, and even computers integrated with cars and other machines. Speech inputs may be used to control many different aspects of programs executed on computing devices, including but not limited to operating system functions and application functions.

SUMMARY

Embodiments are disclosed that relate to identifying phonetically similar speech grammar terms during computer program development. For example, one disclosed embodiment provides a method including providing a speech grammar development tool configured to receive input of a text representation of each of a plurality of proposed speech grammar terms, convert each text representation to a phonetic representation of the speech grammar term, compare the phonetic representation of the speech grammar term to the phonetic representations of other speech grammar terms using a weighted similarity matrix, and provide an output regarding risk of confusion between two proposed speech grammar terms based upon a comparison of the phonetic representations of the two proposed speech grammar terms. The method further includes receiving data regarding incorrect speech grammar term identification, and modifying one or more weights in the weighted similarity matrix based upon the data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

During development of a computer program, speech grammar terms may be selected that are phonetically similar to be potentially confusable by a speech recognition system. If a speech input made by a user is misidentified by a speech recognition system, the computing device may perform an action other than the action intended by the user. This may lead to an unsatisfactory user experience.

In light of this, computer program developers may take great care to avoid using two or more speech grammar terms in a same state of a program that can pose such a risk of confusion. As such, developers may perform testing that involves iteratively performing a large number of speech recognition simulations using real audio data and real proposed speech grammars. This testing may consume significant time and resources. Further, in some instances developers may not be aware of a risk of confusion until it is very expensive, or even too late, to fix the problem.

Accordingly, embodiments are disclosed herein that predict risks that speech grammar terms may be confused by a speech recognition system. Briefly, the disclosed embodiments convert text representations of proposed speech grammar terms to phonetic representations, and then compare the phonetic representations to determine a similarity between the terms. If it is determined that there is a risk of confusion, an output may be provided to alert a developer of this risk. In some instances, multiple different levels of risk may be recognized, and corresponding different alerts may be provided for the different levels of risk. In this manner, the iterative testing of proposed speech grammars using real audio data may be avoided. Further, the disclosed embodiments also may update data used in the conversion and comparison processes over time based upon actual use data from end users and/or developers, which may help to improve the identification of potentially confusing speech grammar terms over time.

Figure 1:
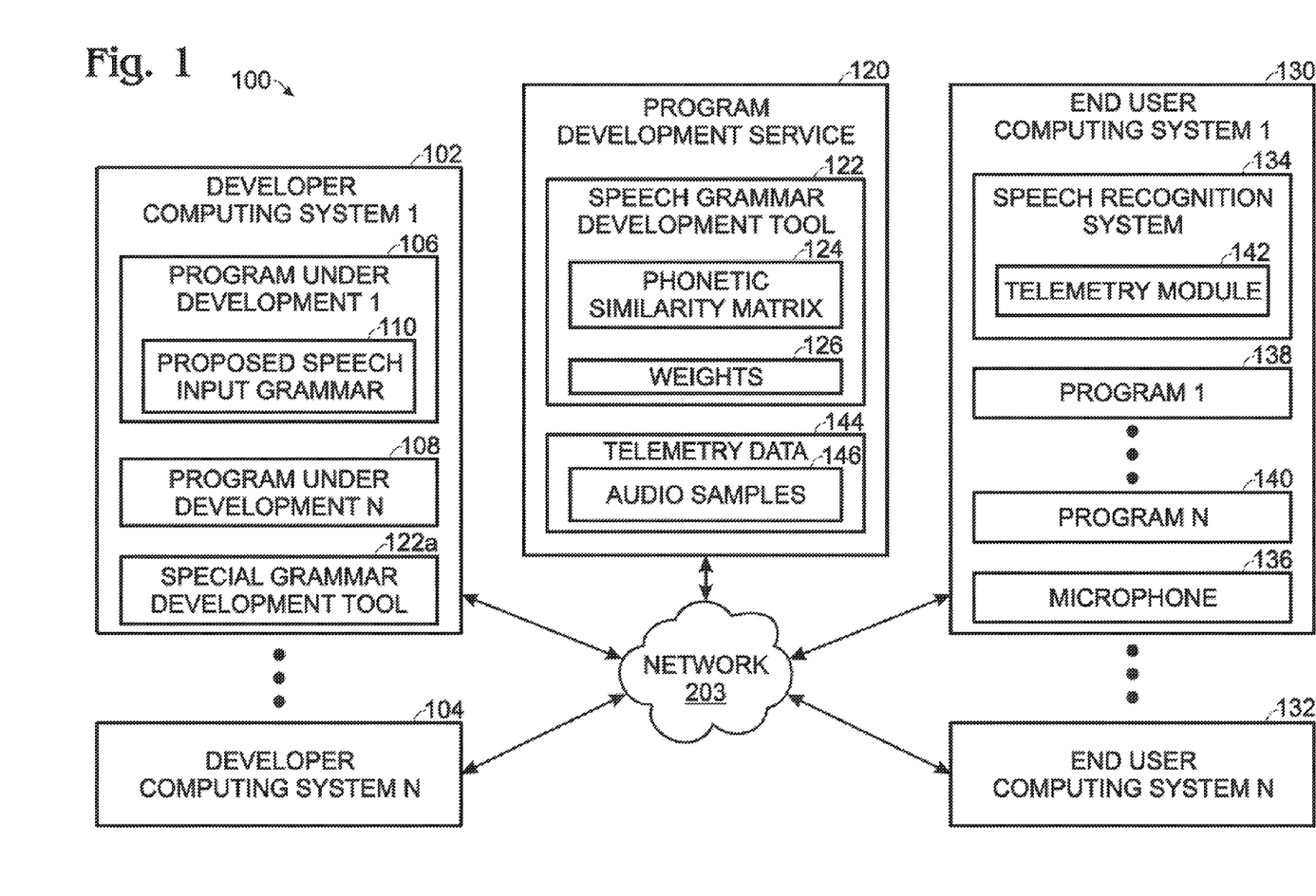
FIG. 1 shows a block diagram of an embodiment of a computer program development and use environment.

Before discussing these embodiments in detail, an example use environment 100 is described with reference to FIG. 1. Environment 100 comprises a plurality of developer computing systems, illustrated schematically as developer computing system 1 102 and developer computing system n 104. The developer computing systems may represent computing systems operated by computer program developers while developing computer programs that utilize speech inputs. Example programs are represented schematically by program under development 1 106 and program under development n 108. A program under development may include a proposed speech grammar 110. The proposed speech grammar 110 may specify, for example, speech commands that are utilized in each state of the corresponding program.

Computer programs may be developed via use of software development tools (e.g. a software development kit (SDK)) provided, for example, by a company that manufactures a device and/or operating system on which a computer program is to be executed. FIG. 1 illustrates a program development service 120 at which computer program development tools, such as a speech grammar development tool 122, may be accessed by developers utilizing computing systems 102, 104. The speech grammar development tool may be downloaded to the developer computing systems for execution locally on the developer computing systems, as shown at 122a, and/or may be executed remotely from the developer computing systems as a remote software service.

As described in more detail below, the speech grammar development tool 122 is configured to help computer program developers identify potentially confusing speech grammar terms from text representations input by the developers by converting the text representations to phonetic representations, and then comparing the phonetic representations to determine a similarity between a pair of proposed speech grammar terms. Further, in some embodiments, the game development tool 122 may be configured to suggest synonyms that pose less of a risk of phonetic confusion. To help determine similarities between proposed speech grammar terms, the speech grammar development tool 122 may utilize a phonetic similarity matrix 124. As described in more detail below, the phonetic similarity matrix may include information regarding differences in phonetic features between phonemes, and thus may be used to determine by how many phonetic features phonemes differ. As a non-limiting example, a phonetic difference between "pin" and "bin" may be smaller than the phonetic difference between "bin" and "tin," as the phonemes /p/ and /b/ differ by just the phonetic feature "voiced", whereas /b/ and /t/ differ by the distinct phonetic features "voiced" and "coronal."

In some embodiments, the phonetic similarity matrix 124 may comprise individually adjustable weights 126 utilized to weight each phonetic feature in the phonetic similarity matrix 124. As not all distinct phonetic features are equally important for speech recognition, individual weights may be set to emphasize phonetic features and to deemphasize others. Further, the weights 126 may be adjusted based upon observed speech recognition errors as determined from real-life usage data.

Real life usage data may be collected from end user computing systems, represented by end user computing system 1 130 and end user computing system n 132. Each end user computing system 130, 132 may include a speech recognition system 134 configured to detect recognized speech segments from audio data received via a microphone 136 or other suitable acoustic input device. Recognized speech segments may be provided by the speech recognition system 134 to programs on the end user computing devices, represented by program 1 138 and program n 140, based upon the speech grammars of those programs. As end users interact with the end user computing systems 130, 132 via speech inputs, data regarding both correctly identified speech inputs and incorrectly identified speech inputs may be gathered via a telemetry module 142. The telemetry module 142 may provide such data to the program development service 120, as indicated at 144, for use in potentially modifying the phonetic similarity matrix 124. For example, if it is found that two speech grammar terms are confused more often than would be expected from the phonetic similarity matrix 124, the weights for one or more phonetic features of the speech grammar terms may be adjusted to reflect the higher risk of confusion. Likewise, if it is found that a speech grammar term has an unexpected actual pronunciation compared to the phonetic representation generated by the speech grammar development tool 122, a phonetic representation of the actual pronunciation may be stored for use in generating future phonetic representations of that speech grammar term. It will be understood that the weights may be adjusted manually based upon the real life usage data, and/or may be adjusted algorithmically. The telemetry data 144 may comprise any suitable information, including but not limited to audio samples 146, information regarding the speech grammar term identified based upon the audio sample, and information regarding whether the phrase in the audio sample was identified correctly or incorrectly, including information regarding a confidence score for the identification (e.g. a score that indicates how confident the speech recognizer was in the result).

Figure 2A:
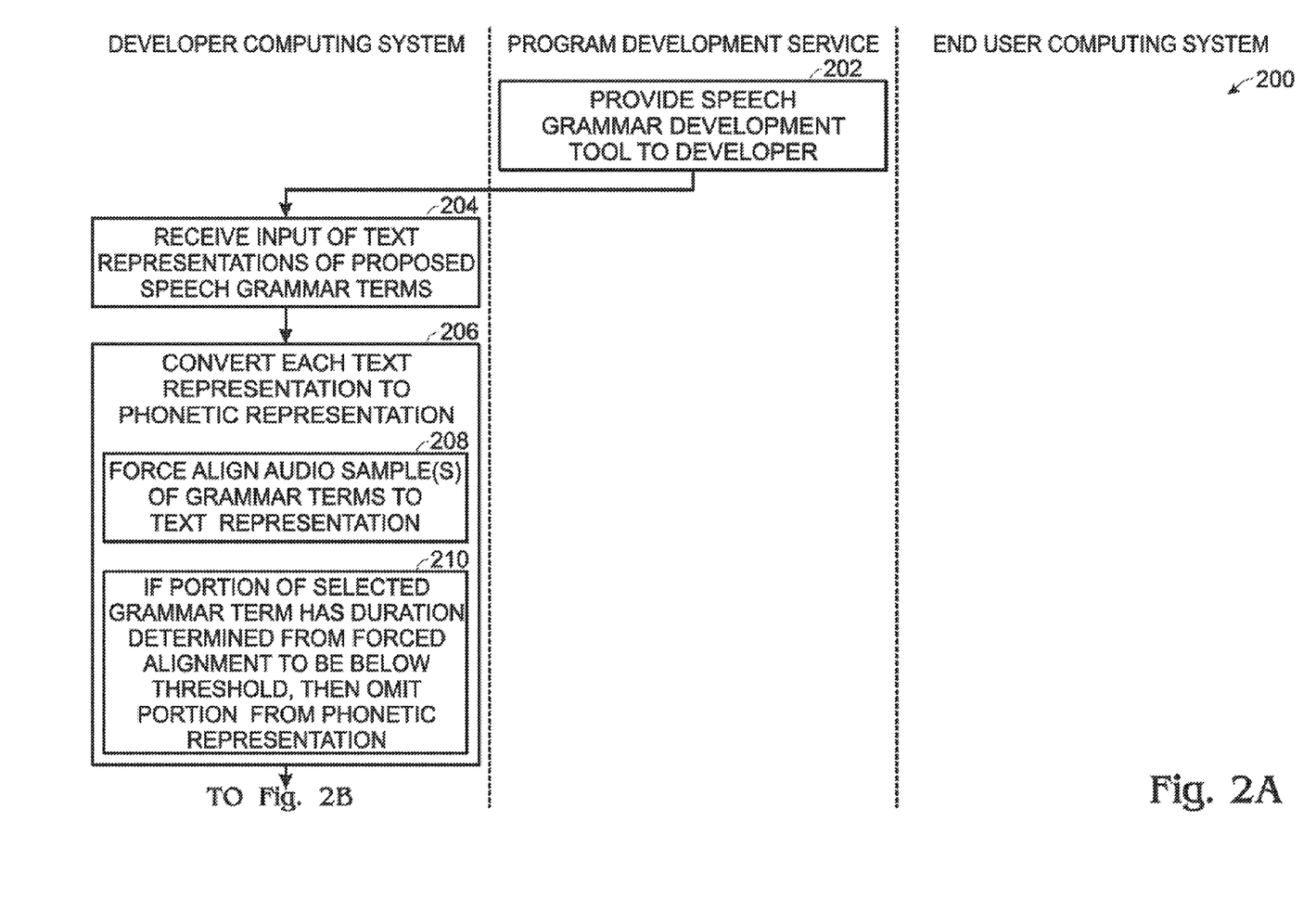
FIGS. 2A-2C show a flow diagram depicting an embodiment of a method for detecting phrase confusion risk between speech grammar terms during computer program development.
Figure 2B:
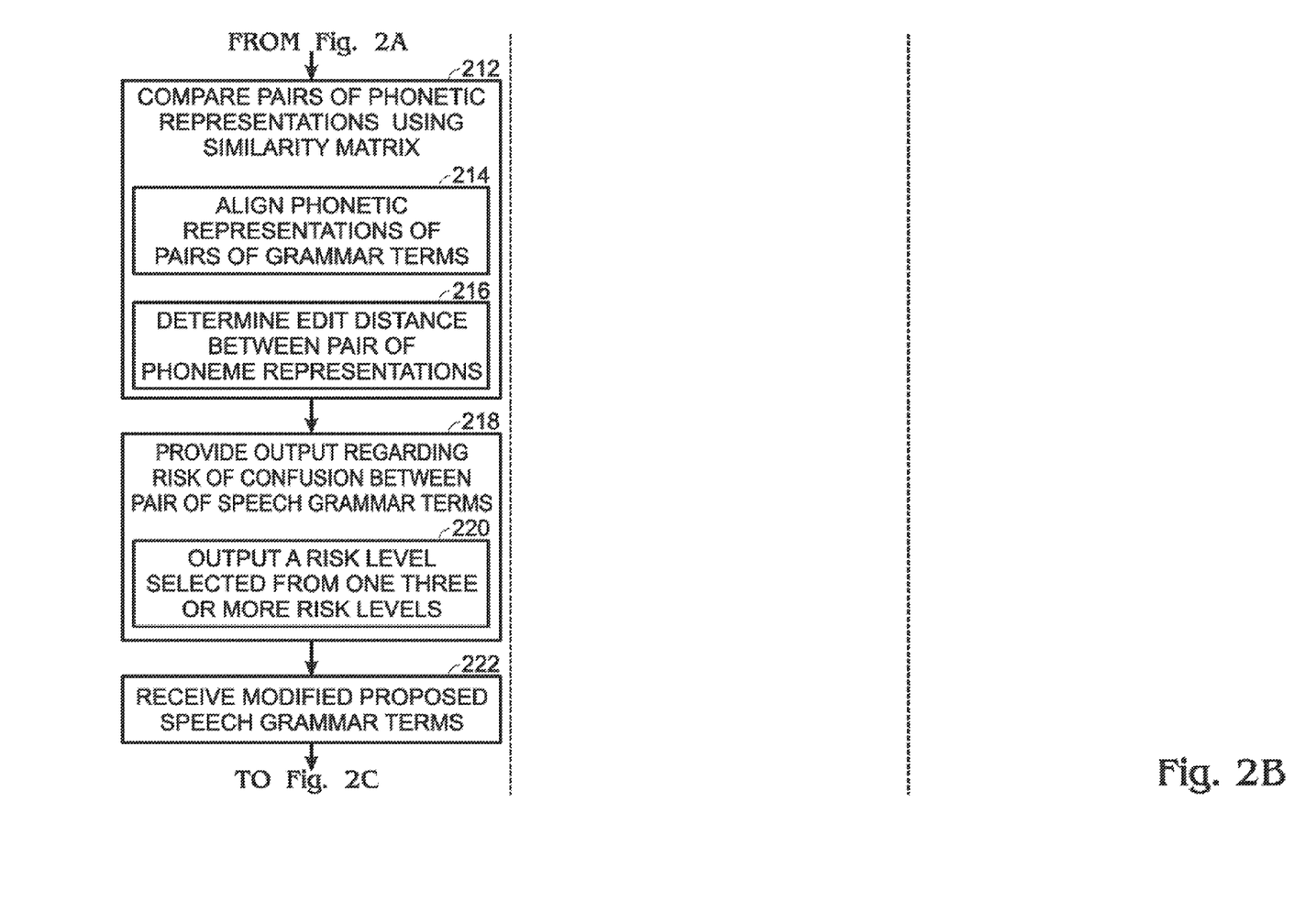
Figure 2C:
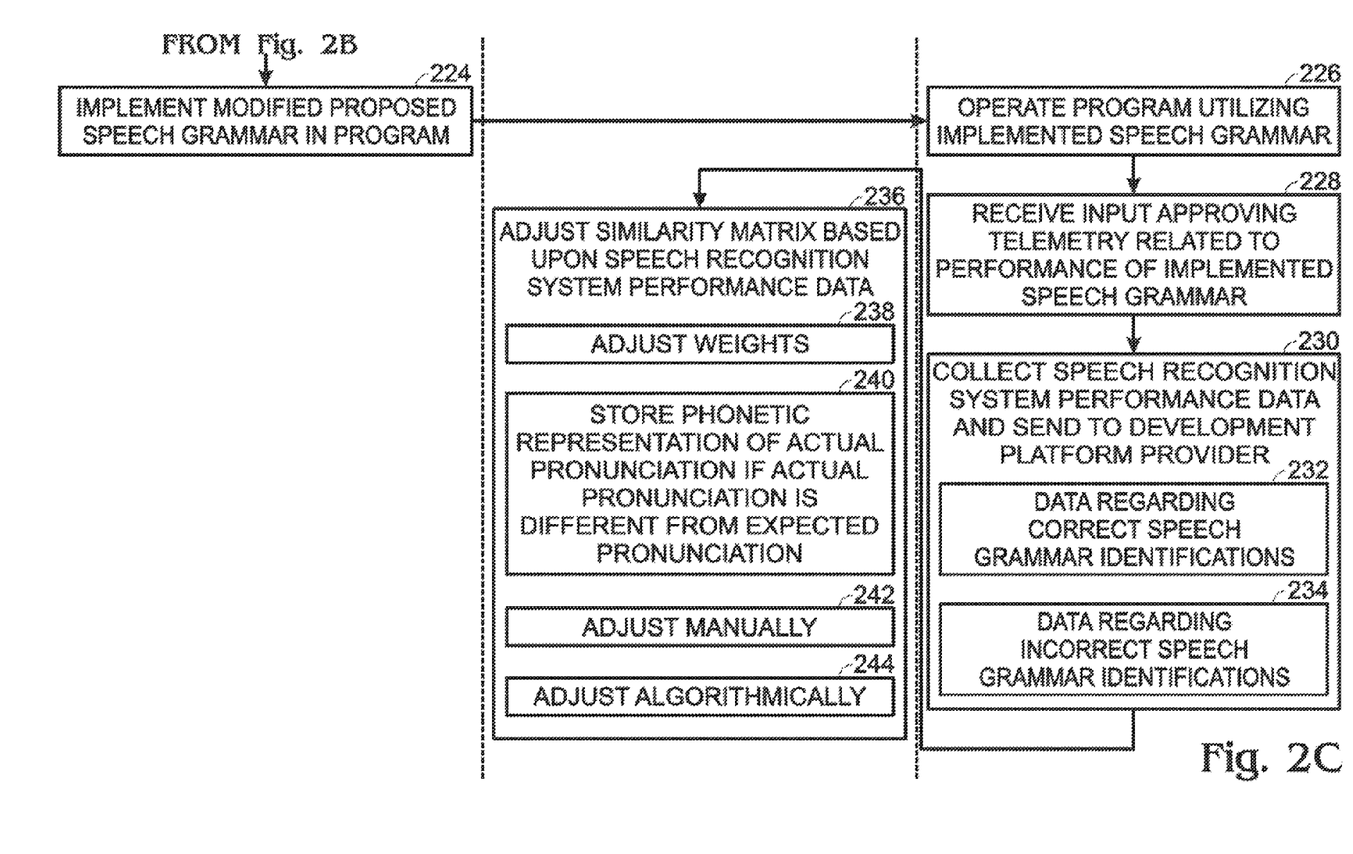

FIGS. 2A-2C show a flow diagram depicting an embodiment of a method 200 for detecting phrase confusion risk between proposed speech grammar terms. Method 200 shows processes occurring at three different example locations, namely, a developer computing system (represented by the left column), a program developer service (represented by the middle column), and an end user computing system (represented by the right column). It will be understood that the particular locations and order of processes shown in FIGS. 2A-2B are depicted for the purpose of example, and is not intended to be limiting in any manner, as the depicted processes may be performed in any suitable order and at any suitable location or locations.

Method 200 comprises, at 202, providing a speech grammar development tool for use by the developer computing system. The speech grammar development tool may be downloaded by the developer computing system, may operate as a remote service accessible by the developer computing system via a network 203, or may operate in any other suitable manner. Method 200 further comprises, at 204, receiving an input of text representations of proposed speech grammar terms for a program under development.

As mentioned above, if the proposed speech grammar comprises confusable phrases, there is a risk that a speech recognition engine may incorrectly interpret a detected speech input. As such, to help detect potentially confusable speech grammar terms, method 200 comprises, at 206, converting each text representation to a phonetic representation to allow for the identification of potentially confusable speech grammar terms. Any suitable methods may be used to convert the text representations into phonetic representations (which may or may not be text based). Examples include, but are not limited to, the use of a speech recognition engine, letter-to-sound techniques, the use of a pronunciation dictionary or dictionaries, manually created pronunciations, and/or phoneme recognizers.

In some embodiments, the speech grammar terms are converted to phonetic representations using only the text representations provided by the developer. In other embodiments, additional information may be considered for further accuracy. For example, as depicted at 208, one or more audio samples corresponding to a proposed speech grammar term may be retrieved from storage and analyzed by a speech recognition engine using a "force align" mode. The force align mode matches the audio sample to a phonetic representation of the proposed speech grammar term as determined from the text representation, and outputs a phonetic representation of the term with time stamps indicating the duration of each phoneme in the audio sample. Such audio samples may be received from end users during actual use and/or from developers during software development, or may be obtained in any other suitable manner.

For words in which syllables may be shortened or dropped in spoken language, the force align will output phonemes with small time stamp values for those syllables. As such, the time stamps of the phonemes may be compared to a threshold duration (which may be absolute or relative), and any phonemes with time stamps below the threshold may be omitted from the phonetic representation, as indicated at 210. As a non-limiting example, the second syllable of the word "vegetable" may be shortened or omitted during ordinary pronunciation of this word. As such, the time stamp of this syllable as determined from forced alignment may be sufficiently small to omit this syllable from the phonetic representation of "vegetable." In this manner, the phonetic representation of the proposed speech grammar term may reflect the actual spoken pronunciation of the term more closely than if the forced alignment of an acoustic sample of the term were not applied, and therefore may help to identify potentially confusing speech commands more accurately.

After generating the phonetic representations of the proposed speech grammar terms, method 200 comprises, at 212, comparing phonetic representations of pairs of proposed speech grammar terms using a phonetic similarity matrix. As described above, the phonetic similarity matrix may include information regarding phonetic features of each phoneme (or at larger-than-phoneme units, e.g. a syllable matrix), and may allow a phonetic distance between phonemes to be determined.

Figure 3:
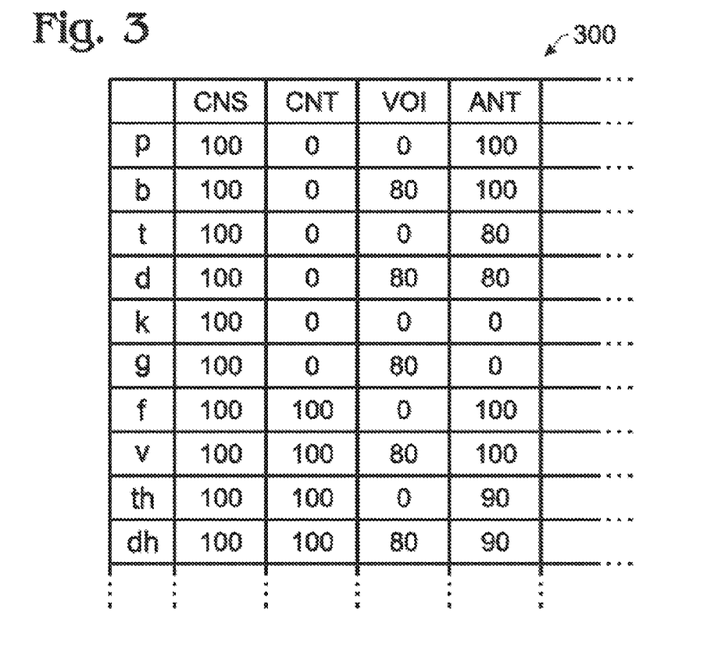
FIG. 3 shows an embodiment of a portion of a weighted similarity matrix for use in identifying phrase confusion risk between speech grammar terms.

FIG. 3 shows a schematic depiction of a portion of an example phonetic similarity matrix 300 that depicts four phonetic features for each of ten English phonemes. The four phonetic features are CNS (consonatal), CNT (continuous), VOI (voiced), and ANT (anterior). As can be seen in the example phonetic similarity matrix, /p/ and /b/ differ by one of the four phonetic features (VOI), whereas /p/ and /g/ differ by two (VOI, and ANT). Thus, /p/ and /g/ may be less likely to be confused than /p/ and /b/.

In some embodiments, each phonetic feature for each phoneme may be given one of two values (e.g. 0 and 1), representing not similar and similar. In other embodiments, as shown in FIG. 3 a phonetic similarity matrix may be weighted, such that each phonetic feature has a weight within a range of values (e.g. a value between 0 and 100). The use of weights in a phonetic similarity matrix may allow the matrix to be adjusted, for example, based upon detected phrase confusion during real-world use, and also to reflect a relative importance of various phonetic features for speech recognition. The weights also add granularity and refinement to the distance metric in the phonetic similarity matrix.

Returning to FIG. 2, comparing the phonetic representations of the proposed speech grammar terms at 212 may involve various processes. For example, the phonetic representation of a speech grammar term may be aligned with that of another speech grammar term for comparison, as shown at 214. Alignment may be used to help ensure that the two phonetic representations are compared in a manner to produce a strongest phonetic similarity between the two terms. Any suitable alignment method may be used, including but not limited to a Smith-Waterman alignment method. After alignment, an edit distance may be determined for the pair of phonetic representations, as indicated at 216. This may help to determine how many phonetic differences exist between the two phonetic representations, and thus how phonetically different the representations are. As described above, the phonetic similarity matrix may be used to determine this edit distance.

After determining the edit distance between a pair of phonetic representations of proposed speech grammar terms, method 200 may comprise, at 218, providing an output regarding a risk of confusion between the pair of proposed speech grammar terms. The risk of confusion may be determined in any suitable manner. For example, the risk of confusion may be determined by comparing the edit distance for a pair of proposed speech grammar terms (or other measure of similarity) to one or more thresholds that each define a selected confusion risk. Any suitable number of thresholds may be used to determine any suitable number of different confusion risks. For example, in some embodiments, a single threshold may be used to distinguish two different risks (e.g. "risk" and "no risk") of confusion. In other embodiments, two or more thresholds may be used to distinguish between three or more risks of confusion, as indicated at 220. In one non-limiting example, the output may indicate whether the phrases are homophones (e.g. bye and buy), highly confusable (e.g. Bieber and beaver), medium confusable (e.g. search and surge), and not confusable or otherwise low risk. The thresholds may be manually selected and adjusted based upon research and/or automatically selected and adjusted based upon audio data, and/or may be selected by developers who wish to specify a particular level of confusion risk (e.g. "show me only high confusion risks" or "show me all confusion risks"). The output may be provided in any suitable manner, such as by a visual indicator displayed on a computing device display.

If the output indicates that a confusion risk exists, a developer may choose to modify the proposed speech grammar for the program under development. As such, method 200 comprises, at 222, receiving modified proposed speech grammar terms, and at 224, implementing the modified proposed speech grammar terms in the program.

In some embodiments, where a risk of confusion is identified, the speech grammar development tool may recommend a replacement phrase. The suggested replacement phrase may be selected based on data related to localization, synonyms, and/or any other suitable information. For example, if the proposed term 'dismiss' isn't working properly because it is confusable with some other phrase, then the tool may suggest 'cancel' as a replacement for this command.

After development is complete, the program may be distributed to end users for use. Method 200 thus comprises, at 226, operating the program utilizing the implemented speech grammar via an end user computing system. As an end user interacts with the program via speech inputs, the program may identify speech inputs incorrectly on occasion. To provide feedback on both correct and incorrect identifications, a telemetry module executed via the end user computing system may be used to gather such data for analysis, if the end user chooses to permit the performance of such telemetry. As such, method 200 comprises, at 228, receiving an input approving the use of telemetry related to the performance of the implemented speech grammar. Further, method 200 comprises, at 230, collecting speech recognition system performance data, and sending the data to the program development service. The data may include data regarding correct speech identification 232, as well as data regarding incorrect speech identification 234. Where the data shows a plurality of instances of incorrect identifications of a speech grammar term, the similarity matrix may be adjusted to help avoid future misidentifications of that term.

The data received via telemetry may be used to adjust the phonetic similarity matrix, as indicated at 236. Any suitable adjustments may be made. For example, as indicated at 238, one or more weights associated with phonetic features in the matrix may be adjusted. Further, as indicated at 240, a phonetic representation of an actual pronunciation of a term may be stored if the actual pronunciation is different from an expected pronunciation. Such adjustments to the similarity matrix may be made manually, as indicated at 242, and/or automatically, as indicated at 244.

The disclosed embodiments may help to avoid selecting speech grammar terms that risk confusing a speech recognition system in a simple and efficient manner compared to methods that involve iteratively testing proposed speech grammars. Thus, the disclosed embodiments may help developers move products to market more quickly and with less expense.

In some embodiments, the methods and processes described herein may be tied to a computing system of one or more computing devices. In particular, such methods and processes may be implemented as a computer-application program or service, an application-programming interface (API), a library, and/or other computer-program product.

Figure 4:
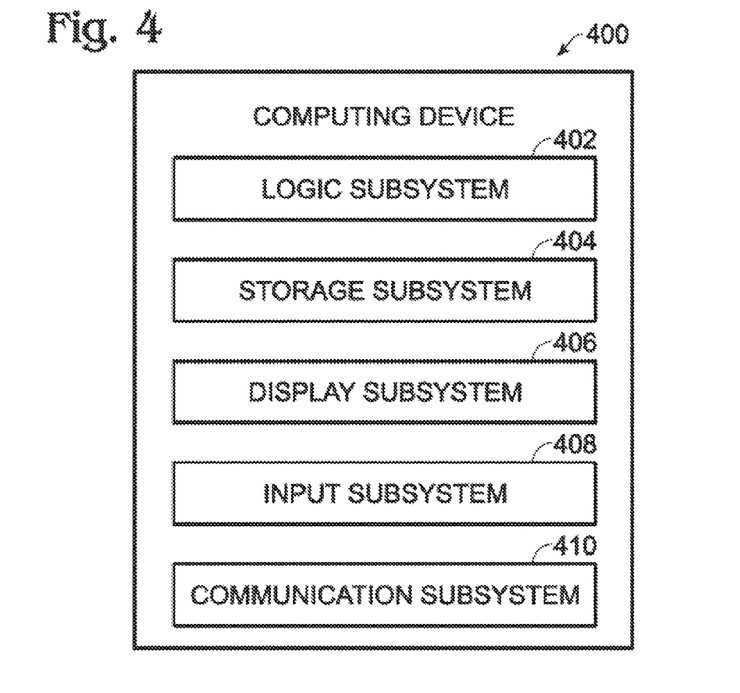
FIG. 4 shows an embodiment of a computing system.

FIG. 4 schematically shows a non-limiting embodiment of a computing system 400 that can enact one or more of the methods and processes described above. Computing system 400 is shown in simplified form. Computing system 400 may take the form of one or more personal computers, server computers, tablet computers, home-entertainment computers, network computing devices, gaming devices, mobile computing devices, mobile communication devices (e.g., smart phone), and/or other computing devices.

Computing system 400 includes a logic subsystem 402 and a storage subsystem 404. Computing system 400 may optionally include a display subsystem 406, input subsystem 408, communication subsystem 410, and/or other components not shown in FIG. 4.

Logic subsystem 402 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute machine-readable software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 404 includes one or more physical devices configured to hold instructions executable by the logic subsystem to implement the methods and processes described herein. When such methods and processes are implemented, the state of storage subsystem 404 may be transformed—e.g., to hold different data.

Storage subsystem 404 may include removable and/or built-in devices. Storage subsystem 404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 404 may include volatile, nonvolatile, dynamic, static, read/write, read-only, random-access, sequential-access, location-addressable, file-addressable, and/or content-addressable devices.

It will be appreciated that storage subsystem 404 includes one or more physical devices, and excludes propagating signals per se. However, aspects of the instructions described herein alternatively may be propagated by a communication medium (e.g., an electromagnetic signal, an optical signal, etc.), as opposed to being stored in a storage medium.

Aspects of logic subsystem 402 and storage subsystem 404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 implemented to perform a particular function. In some cases, a module, program, or engine may be instantiated via logic subsystem 402 executing instructions held by storage subsystem 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 406 may be used to present a visual representation of data held by storage subsystem 404. This visual representation may take the form of a graphical user interface (GUI). As the herein described methods and processes change the data held by the storage subsystem, and thus transform the state of the storage subsystem, the state of display subsystem 406 may likewise be transformed to visually represent changes in the underlying data. Display subsystem 406 may include one or more display devices utilizing virtually any type of technology. Such display devices may be combined with logic subsystem 402 and/or storage subsystem 404 in a shared enclosure, or such display devices may be peripheral display devices.

When included, input subsystem 408 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or speaker recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 410 may be configured to communicatively couple computing system 400 with one or more other computing devices. Communication subsystem 410 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 400 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing system comprising a processor, a method of detecting phrase confusion risk in a proposed speech grammar for a computer program, the method comprising:
providing, by downloading to a remote computing device, via the processor a speech grammar development tool executable by the remote computing device to
receive input of a text representation of each of a plurality of proposed speech grammar terms,
for each proposed speech grammar term, convert the text representation to a phonetic representation of the speech grammar term,
determine whether a portion of the proposed speech grammar term has a spoken duration below a threshold duration, and if the portion of the proposed speech grammar term has a spoken duration below the threshold duration, then omit the portion from the phonetic representation of the proposed speech grammar term,
compare via a speech recognition engine the phonetic representation of the speech grammar term to the phonetic representations of other speech grammar terms using a weighted similarity matrix, and
provide an output regarding risk of confusion between two proposed speech grammar terms based upon a comparison by the speech recognition engine of the phonetic representations of the two proposed speech grammar terms;
receiving via the processor data regarding incorrect speech grammar term identification; and
modifying via the processor speech grammar used by the speech recognition engine, wherein modifying the speech grammar comprises modifying one or more weights in the weighted similarity matrix based upon the data.

2. The method of claim 1, wherein the weighted similarity matrix comprises, for each phoneme of a plurality of phonemes, a weight for each phonetic feature of a plurality of phonetic features.

3. The method of claim 2, wherein modifying the one or more weights in the weighted similarity matrix comprises manually adjusting the one or more weights based upon the data.

4. The method of claim 2, wherein modifying the one or more weights in the weighted similarity matrix comprises algorithmically adjusting the one or more weights based upon the data.

5. The method of claim 1, wherein determining that the portion of the selected speech grammar term has a spoken duration below a threshold duration comprises force aligning one or more audio samples of the selected speech grammar term to the text representation of the selected speech grammar term and determining that a time stamp of the portion has a value below the threshold duration.

6. The method of claim 5, further comprising receiving the one or more end user audio samples.

7. The method of claim 1, wherein providing the output comprises providing one of three or more possible outputs regarding a relative risk of confusion between the two proposed speech grammar terms.

8. The method of claim 1, wherein the data regarding incorrect speech grammar term identification comprises data regarding an actual pronunciation for a selected speech grammar term that is different than the expected pronunciation of the selected speech grammar term; and
further comprising storing a phonetic representation of the actual pronunciation of the selected speech grammar term.

9. On a computing device comprising a processor, a method of detecting phrase confusion risk in proposed speech grammar for a computer program, the method comprising:
obtaining via the processor a speech grammar development tool by downloading the speech grammar development tool from a server computing system;
receiving via the processor an input of a text representation of a speech grammar term;
determining via the processor a phonetic representation of the speech grammar term from the text representation;
if a portion of the speech grammar term comprises a duration below a threshold duration, then omitting via the processor the portion of the phonetic representation of the speech grammar term;
comparing via a speech recognition engine executed by the processor the phonetic representation of the speech grammar term to a phonetic representation of another speech grammar term, wherein comparing comprises using a weighted similarity matrix;
outputting to a display a representation of a risk of confusion between the speech grammar term and the other speech grammar term based upon a comparison by the speech recognition engine of the speech grammar term and the other speech grammar term;
determining that the speech grammar term was incorrectly identified;
sending data regarding the incorrect determination to the server computing system;
receiving a modified weighted similarity matrix from the server computing system; and
modifying via the processor the speech grammar used by the speech recognition engine based upon the modified weighted similarity matrix.

10. The method of claim 9, further comprising determining that the portion of the selected speech grammar term has a spoken duration below a threshold duration by force aligning one or more audio samples of the selected speech grammar term to the text representation of the selected speech grammar term and determining that a time stamp of the portion has a value lower than the threshold duration.

11. The method of claim 10, further comprising receiving the one or more audio samples from end users via telemetry.

12. The method of claim 9, wherein comparing the phonetic representation of the speech grammar term to a phonetic representation of another speech grammar term comprises using a weighted similarity matrix.

13. The method of claim 12, further comprising receiving data regarding incorrect speech grammar term identification, and modifying one or more weights in the weighted similarity matrix based upon the data.

14. The method of claim 9, wherein outputting the representation of a risk of confusion comprises providing one of three or more possible outputs to indicate a relative risk of confusion between the two proposed speech grammar terms.

15. A computing system, comprising:
a processor; and
a memory storing instructions executable by the processor to:
provide, by downloading to a remote computing device, a speech grammar development tool configured to
receive input of a text representation of each of a plurality of proposed speech grammar terms;

for each proposed speech grammar term, convert the text representation to a phonetic representation of the speech grammar term, determine whether the proposed speech grammar term comprises a portion that has a spoken duration below a threshold duration, and when the portion of the proposed speech grammar term has a spoken duration below the threshold duration, then omit the portion from the phonetic representation of the proposed speech grammar term, and compare via a speech recognition engine the phonetic representation of the speech grammar term to the phonetic representations of other speech grammar terms using a weighted similarity matrix, the weighted similarity matrix comprising, for each phoneme of a plurality of phonemes, a weight for each phonetic feature of a plurality of phonetic features, and provide an output regarding risk of confusion between two proposed speech grammar terms based upon a comparison via a speech recognition engine of the phonetic representations of the two proposed speech grammar terms;

receive data regarding one or more incorrect speech grammar term identifications, the data comprising an actual pronunciation for a selected speech grammar term that is different from the expected pronunciation of the selected speech grammar term;

store a phonetic representation of the actual pronunciation of the selected speech grammar term; and modify speech grammar to be used by the speech recognition engine, wherein modifying the speech grammar comprises modifying one or more weights in the weighted similarity matrix based upon the data.

16. The computing system of claim 15, wherein the instructions are executable to determine that the portion of the selected speech grammar term has a spoken duration below a threshold duration by force aligning one or more audio samples of the selected speech grammar term to the text representation of the selected speech grammar term and determining that a time stamp of the portion has a value lower than the threshold duration.

17. The computing system of claim 16, wherein the instructions are executable to receive the one or more audio samples from end users.

18. The computing system of claim 15, wherein the instructions are executable to output three or more possible outputs to indicate of a relative risk of confusion between the two proposed speech grammar terms.

\* \* \* \* \*